United States Patent [19]

Norwood

[11] 4,101,613
[45] Jul. 18, 1978

[54] PRODUCTION OF SHAPED, HIGH POLYMERIC ARTICLES

[75] Inventor: David Norwood, Baltimore, Md.

[73] Assignee: Concorde Fibers, Inc., Columbia, Md.

[21] Appl. No.: 622,555

[22] Filed: Oct. 15, 1975

[51] Int. Cl.² .............................................. B29B 3/02
[52] U.S. Cl. ................................. 264/40.3; 264/40.4; 264/40.7; 264/211
[58] Field of Search ............. 260/40 P, 42.54, 37 NP; 264/40.3, 40.4, 40.7, 211, 349

[56] References Cited

U.S. PATENT DOCUMENTS

| B 579,153 | 3/1976 | Brinkmann et al. | 264/40 |
| 3,148,231 | 9/1964 | Spencer | 264/40.7 |
| 3,148,412 | 9/1964 | Spreeuwers | 264/349 |
| 3,352,952 | 11/1967 | Marr | 264/176 R |
| 3,391,232 | 7/1968 | Jackson | 264/40.7 |
| 3,496,133 | 2/1970 | Hoffman | 260/40 P |
| 3,619,433 | 11/1971 | Windley | 264/176 Z |
| 3,624,025 | 11/1971 | Twist | 264/40.4 |
| 3,755,516 | 8/1973 | Bonikowski et al. | 264/40.7 |
| 3,905,937 | 9/1975 | Khanna | 260/37 NP |
| 3,984,509 | 10/1976 | Hall et al. | 264/211 |

FOREIGN PATENT DOCUMENTS

| 673,668 | 11/1963 | Canada | 264/211 |
| 1,195,458 | 6/1970 | United Kingdom | 260/40 |

Primary Examiner—Jay H. Woo
Attorney, Agent, or Firm—Nolte and Nolte

[57] ABSTRACT

There is disclosed a method of and apparatus for use in the production of shaped, high polymeric articles, particularly yarns, in which natural, thermo-plastic high polymeric material and a coloring agent are mixed together and the delivery of the coloring agent for mixing is controlled in dependence upon the rate at which the mixture is processed.

2 Claims, 4 Drawing Figures

PRODUCTION OF SHAPED, HIGH POLYMERIC ARTICLES

BACKGROUND OF THE INVENTION

This invention is concerned with the production of shaped, high polymeric articles; particularly, but not necessarily exclusively, it is concerned with the production of synthetic fibers or yarns.

An apparatus used in the production of synthetic yarns comprises a hopper unit containing a mixture of natural or unpigmented thermoplastic, high polymeric material usually in pellet form and a coloring agent. An extruder draws from said hopper unit and directs extrudate to a plurality of spinnerets producing yarn ends which are subsequently quenched and further processed.

Conventionally to produce high quality synthetic yarns of which the color is held constant to close tolerances the mixture contained in the hopper is produced in batches those batches being prepared by weighing the components of the mixture and then combining them. The mixture thus produced is then delivered to the hopper.

It is recognized that to produce lesser quality yarns the batch system of producing the mixture may be discarded in favor of a continuous process in which separate supplies of natural material and coloring agent are delivered directly to the hopper unit. In these arrangements a feed device usually in the form of a gate-like element, is provided in each supply, those devices each having separate control means and as the level of the mixture in the hopper falls those feed devices are opened to deliver natural material and coloring agent to bring up the level in the hopper.

While a continuously operating arrangement clearly is desirable over a batch production technique, as noted hereabove, it has been considered that such an arrangement can only be effective to produce lesser quality yarns. This conclusion finds its basis in the fact that the rates of flow through the feed devices vary appreciably with surface characteristics, shape, angle of repose and other factors so that the actual volumes of natural material and coloring agent delivered to the hopper may vary sufficiently from the amounts called for by the control means to produce substantial color variations.

According to this invention natural material is supplied to the hopper to maintain the level of material in the hopper and the supply of coloring agent to the hopper is controlled in dependence upon the throughput of the extruder. Thus, instead of attempting to make a mixture by controlling two feeds to the hopper each of which is subject to variations, one is, in effect, delivering into the hopper a feed of coloring agent which is related to the rate at which the mixture is being processed and since one is concerned with the amount of coloring agent in the extrudate and since the throughput is very accurately controllable, a much greater accuracy of color maintenance is achieved and high quality yarn is obtained on a continuous rather than batch basis.

Most desirably, the coloring agent is delivered to the hopper by continously operating feed means, the rate of operation varying only with variations in extruder throughput. In such an arrangement the feed means can, with good effect, be arranged to deliver the coloring agent in measured doses to the hopper, the interval between those doses being controlled in dependence upon extruder throughput.

Another problem with known continuous feed apparatus occurs when changes are made in the extruder throughput since obviously it is necessary to reset the coloring agent feed rate. Besides the adjustment of the feed rate of the coloring agent being of itself time consuming, it is to be understood that this adjustment occurs while the equipment is operating and, as such, until the adjustment is completed, that material being processed through the equipment is lost. Since, according to this invention, the coloring agent feed is matched to extruder throughput, this problem is avoided.

DESCRIPTION OF THE PREFERRED EMBODIMENTS

Figure 1:
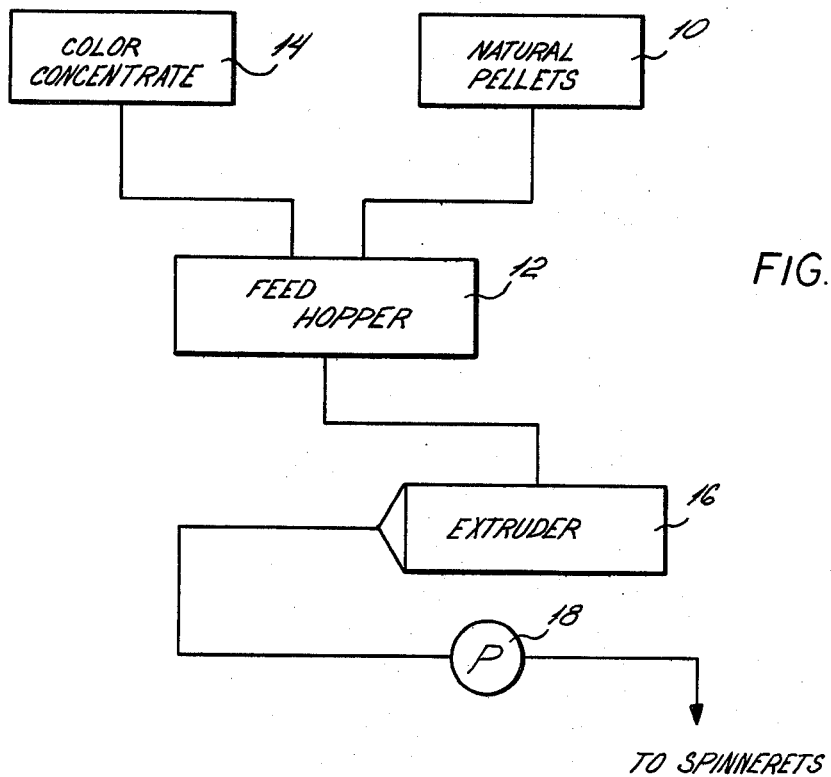
FIG. 1 is a schematic illustration of the equipment with which the present invention is associated.

The apparatus schematically illustrated in FIG. 1 comprises a supply 10 of natural, that is to say unpigmented, thermo-plastic, high polymeric material connected, through appropriate and conventional feed means, to deliver pellets to a hopper 12. The feed means is controlled in dependence upon the level of mixture within that hopper, there being provided sensor means providing a signal when the level falls to a predetermined low to open the feed means and when the level is restored, to close those feed means. Similarly, a supply 14 of a coloring agent is provided, that supply also delivering to the hopper 12 through appropriate feed control means. From the hopper 12 the mixture of the coloring agent and natural pellets is drawn by extruder 16 and is delivered through metering pump 18 to spinnerets. From the spinnerets the yarn ends are quenched and are delivered through various roll stands and other treatment stages to be placed on packages.

Figure 2:
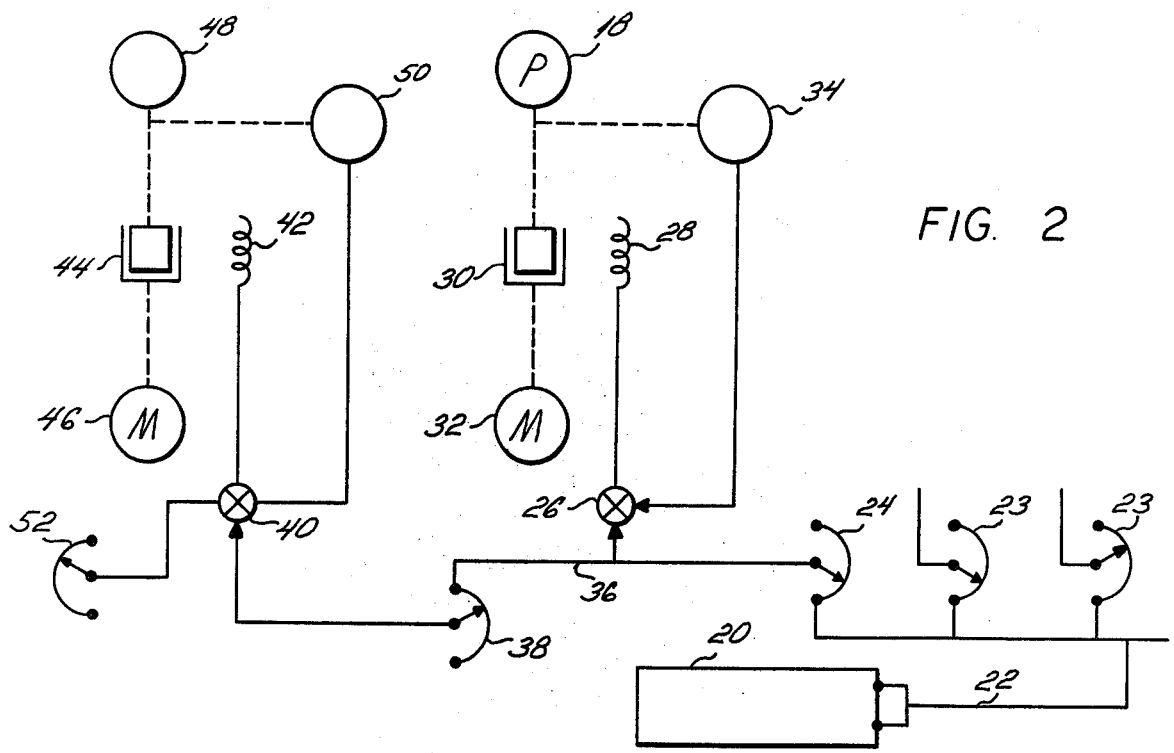
FIG. 2 is a schematic illustration of the circuitry associated with the apparatus of the pesent invention.

In FIG. 2 there is illustrated, schematically, control apparatus according to the present invention.

The apparatus comprises a master control unit 20 which is settable to provide a control current in line 22. Conventionally, the master control 20 is provided with switching means effective to apply either a "Thread" signal on line 22 or a "Run" signal on that line, depending upon whether the apparatus is to be run at a slow speed utilized in setting up the equipment or is to be run at conventional production speed.

The control signal is applied through individual voltage dividers such as potentiometers indicated generally at 23 to the various elements of the equipment for producing yarn as, for example, to the different roll stands, the potentiometers being settable to control the various characteristics of the yarn such as denier and crimp.

A voltage divider or potentiometer 24 is settable to apply a control signal to an input of an adder/substractor element 26, the output of which is connected to a coil 28 associated with an eddy current clutch unit 30, that clutch being disposed between a motor 32 and the metering pump 18. A tachometer 34 is driven by the connection between the clutch and pump 18 and applies a signal to a second input of adder/subtractor 26, in effect providing a feedback loop control accurately to maintain the pumping rate of pump 18 and of course the throughput of extruder 16.

Line 36, connected to the wiper of potentiometer 24, is connected to potentiometer 38 so that a signal proportional to that applied to adder/subtractor 26 from control 20, is applied to an input of adder/subtractor 40. The output of adder/subtractor 40 is applied to coil 42 of an eddy current clutch unit 44, that clutch being disposed between a motor 46 and a feed drive element 48 for the coloring agent.

A tachometer 50 is disposed in the connection between clutch 44 and drive unit 48 and the signal generated by that tachometer is applied to a second input of adder/subtractor 40 in this way to provide a feed back loop control for the feed rate of drive unit 48.

An additional input to adder/subtractor 40 is derived from manually settable speed control potentiometer 52.

It will be appreciated that any adjustment of the pumping rate of metering pump 18 by potentiometer 24 will be automatically reflected in the feed rate of drive unit 48 associated with the feed of the coloring agent so that instead of the conventional arrangement where the extruder throughput is adjusted by adjusting the pumping rate of metering pump 18 and thereafter an adjustment is made in the feed rate of the coloring agent, this is automatically and accurately effected by connecting the two control signals.

Figure 3:
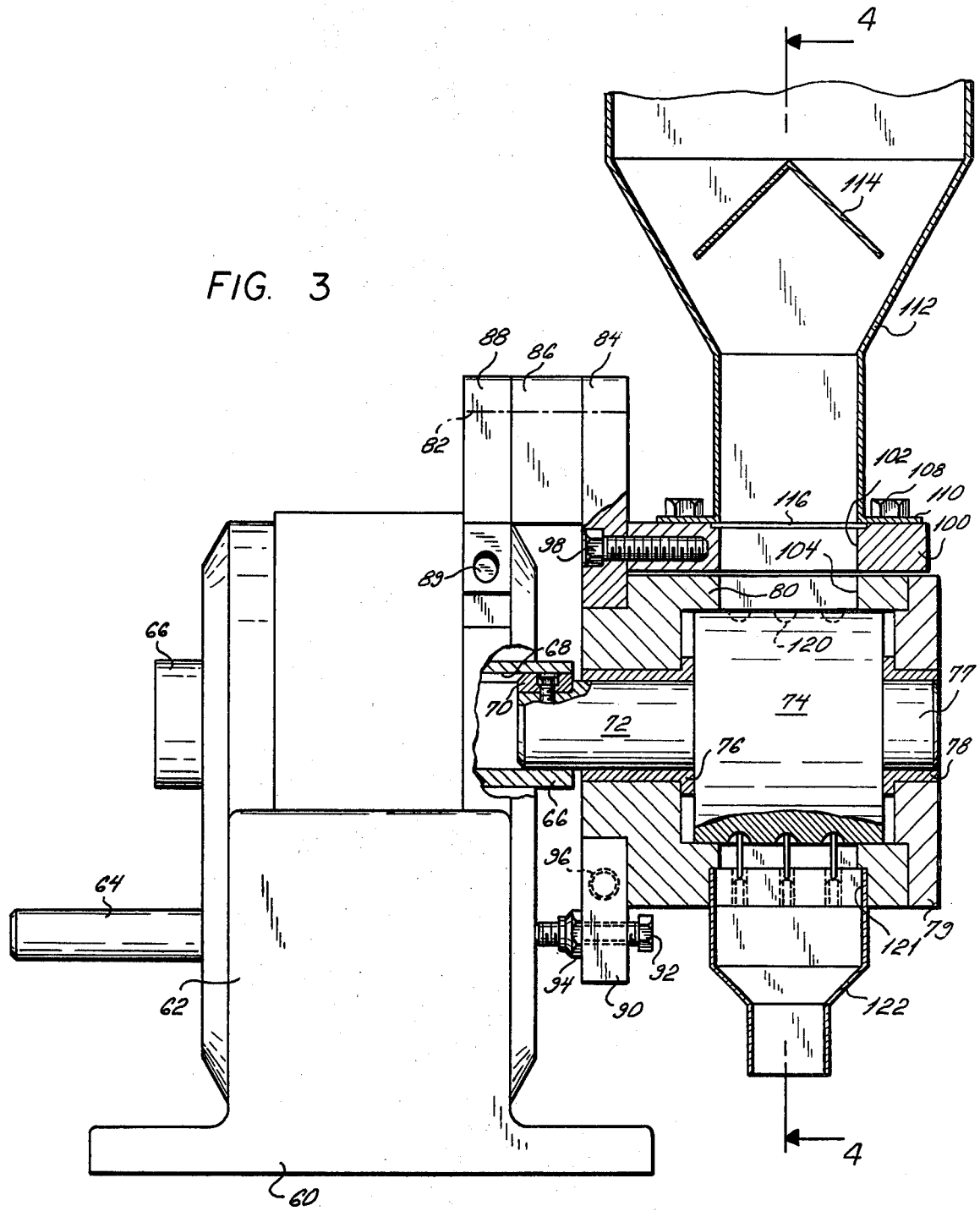
FIG. 3 is a part sectional, part elevational view of apparatus for feeding coloring agent according to this invention.
Figure 4:
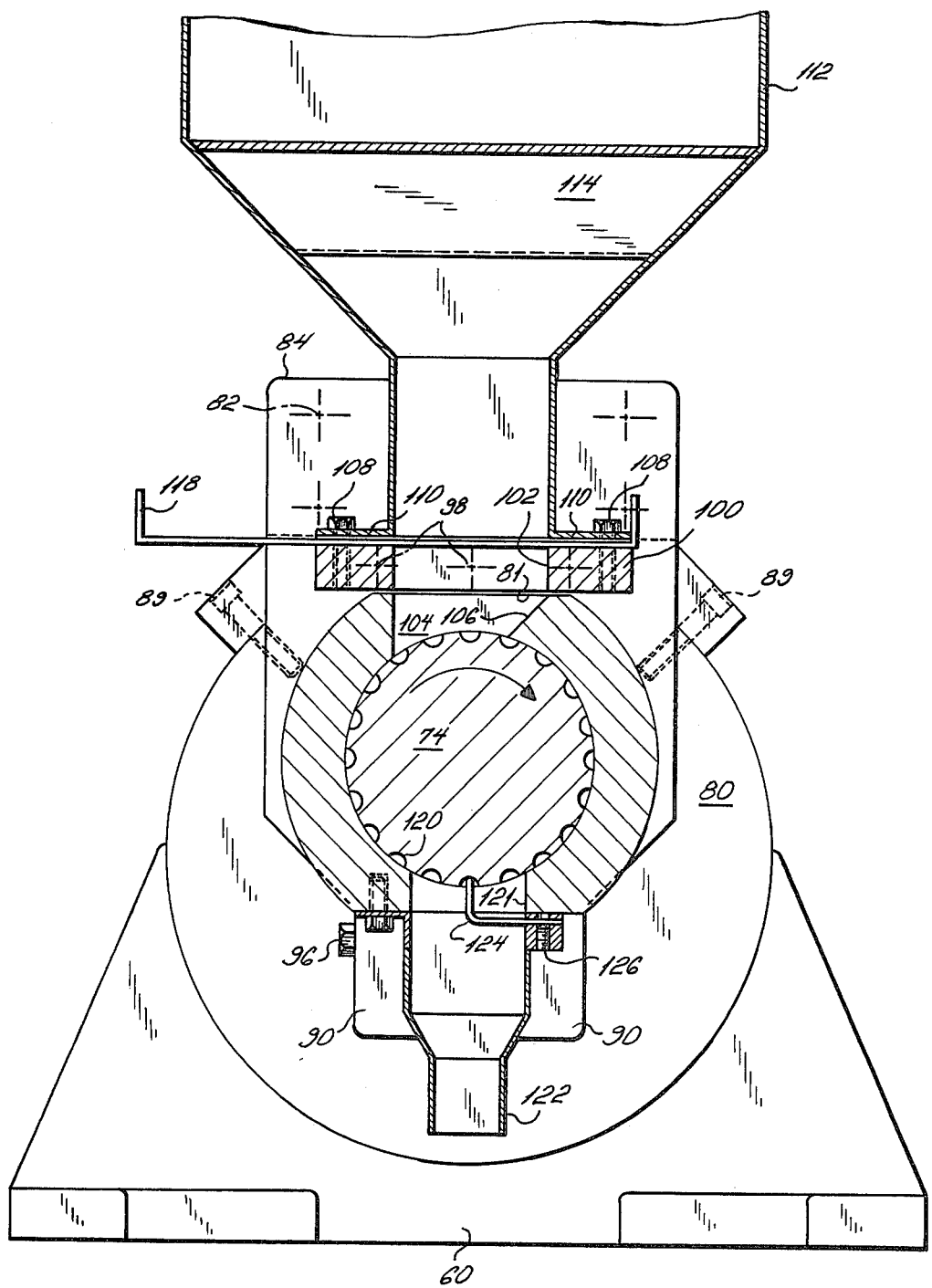
FIG. 4 is a cross sectional view taken along the line 4—4 of FIG. 3.

In FIGS. 3 and 4 there is shown a feed device for the coloring agent, one especially designed for feeding that coloring agent in the form of color concentrate pellets. It is of course to be appreciated that it is well within the compass of this invention to utilize other forms of coloring agent, as, for example, a liquid form and in that case, of course, a pump would be used for feeding that liquid.

The apparatus of FIGS. 3 and 4 comprises a pedestal unit 60 within which a gear transmission 62 is disposed, an input shaft 64 of that transmission being connectable to be driven by a motor 46 (see FIG. 2). A hollow-ended output shaft 66 is provided with a key-way 68 within which a key 70 secured to shaft 72 is disposed so that drive is transmitted from shaft 66 to shaft 72. Shaft 72 carries a rotor 74 described more fully hereinafter.

Shaft 72 is mounted in a bushing 76 disposed in an appropriate bore in a rotor housing 80 of generally cylindrical configuration, and a stub shaft extension 77 of the rotor is supported in a bushing 78 disposed in a bore of a generally disc-like closure member 79 which is secured by appropriate bolt means (not shown in the drawings) to that end of housing 80 remote from transmission 62, the connection between closure member 79 and body 80 being made through a rabbeted mounting configuration.

Housing 80 is mounted to the casing of transmission 62 by means of a bifurcated clamping plate 84, that clamping plate being bolted to a mounting plate 88 secured to the transmission housing by means of bolts 89, the centers of the bolts securing the clamping plate being indicated at 82 in FIG. 4. The spacing between clamping plate 84 and the transmission 62 is established by spacer element 86 disposed between clamping plate 84 and mounting plate 88 and by bolts 92 received within threaded openings of lower portions 90 of the clamping plate, the leading ends of bolts 92 cooperating with an adjacent portion of the casing of transmission 62 and being locked in position by locking nuts 94.

The two portions 90 at the lowermost part of clamping plate 84 are connected by means of a clamping bolt 94 which extends through an opening of one portion 90 and is received in a threaded bore of the other. Tightening of bolt 94 causes the portions to be moved towards each other to clamp housing 80 within an appropriately formed central opening of the clamping plate. By releasing bolt 94 the body element is freed from the clamping plate and housing 80 together, of course, with rotor 74 can be simply removed and replaced or serviced as necessary.

Secured to the clamping plate 84 by means of bolts 98 is a bracket 100 with a central opening 102 which registers with an inlet opening 104 of housing 80, the housing being relieved as at 81 to accommodate that bracket. It will be noted from a consideration of FIG. 4 that the inlet opening 104 has a sloping surface 106, the purpose of which will become apparent from the following description.

Secured to the bracket 100 by means of bolts 108 which extend through corresponding openings in an annular flange 110 is a hopper 112, that hopper including a baffle element 114 effective evenly to distribute pellets of coloring agent falling into the hopper from a supply.

The bracket 100 is provided with a slide-way 116 within which an obturating plate 118 (see FIG. 4) is disposed, that plate being shiftable within the slide-way to close the bottom of hopper 112 and prevent pellets passing from that hopper through opening 102, for example, when the body 80 and rotor 74 are being replaced or serviced.

The inlet opening 104 of housing 80 is closed by the outer surface of rotor 74 which closely conforms to the inner surface of the housing so that pellets of coloring agent will be supported upon the surface of the rotor. Disposed in the outer surface of the rotor 74 are a plurality of pellet receiving pockets 120, in the particular embodiment illustrated there being three rings of angularly spaced such pockets. The pockets are sized to accommodate a particular number of coloring agent pellets. It will be appreciated that as the rotor is turned the edge of surface 106 of body element 80 will wipe pellets in excess of that particular number for which the pockets are designed to accommodate, from the pockets and only the predetermined number of pellets will be carried in the pockets beyond the inlet opening 104.

Continued rotation of the rotor will bring the pellet containing pockets to outlet opening 120 at the bottom of the housing in which opening there is disposed a funnel element 122 to guide pellets falling from the pockets to a hopper such as that at 12 in FIG. 1. To insure that all the pellets within the pockets are dislodged and fall to funnel 122, there are provided a plurality of finger elements 124 held captive by grub screws 126 and having their distal ends disposed to run along the surface of the rotor and, through the resiliency of the elements, press into the pockets 120 when the pockets pass those distal ends.

What is claimed is:

1. In a method of mixing natural thermoplastic, high polymer material and a coloring agent in yarn producing equipment, in which are provided hopper means for receiving the material and the agent and in which is formed a mixture thereof, feed means for continuously delivering the agent to the hopper means and including means for measuring doses of the agent for delivery thereof to the hopper at intervals, means for extruding the mixture and a spinneret, means for drawing the mixture from the hopper through the extruder, and metering pump means for delivering the throughput of the extruder to the spinneret to form yarns; the improvement comprising applying a first control signal to the metering pump means, deriving a second control signal from the first signal, which is proportional to the first signal, applying the second control signal to the means for measuring the doses of the agent for delivery thereof at intervals to the hopper to thereby regulate the interval between delivery of measured doses of the coloring agent to maintain predetermined portions of said material and coloring agent in the mixture in proportion to the output of the extruder.

2. The method of claim 1 further including driving said metering pump means by a first motor, there being a first electrically controlled clutch means disposed between said first motor and said pump, deriving said first control signal from a master control through the intermediary of first voltage divider means, applying said first control signal to said first clutch means, there being a first tachometer associated with said pump, generating a signal by said tachometer and applying the thus generated signal to said electrically controlled clutch means in a feed-back loop circuit, said feed means for delivering said agent to said hopper including a second motor for driving said means for measuring doses of the agent, a second electrically controlled clutch means disposed between said second motor and said agent dose measuring means, deriving said second control signal from said first control signal through the intermediary of second voltage divider means, applying said second control signal to said second clutch means, there being a second tachometer associated with said agent dose measuring means, and generating a signal by said second tachometer and applying the thus generated signal to said second electrically controlled clutch means in a feed-back loop circuit to thereby regulate the agent dose measuring means.

* * * * *